(12) United States Patent
Booher

(10) Patent No.: US 7,152,909 B2
(45) Date of Patent: Dec. 26, 2006

(54) TRAILER AND TRAILER BODY CONSTRUCTION AND EXTRUDED PANEL FOR SAME

(75) Inventor: Howard D. Booher, Atwater, OH (US)

(73) Assignee: East Manufacturing Corporation, Randolph, OH (US)

(*) Notice: Subject to any disclaimer, the term of this patent is extended or adjusted under 35 U.S.C. 154(b) by 93 days.

(21) Appl. No.: 11/072,072

(22) Filed: Mar. 4, 2005

(65) Prior Publication Data

US 2005/0248183 A1   Nov. 10, 2005

Related U.S. Application Data

(63) Continuation-in-part of application No. 10/745,248, filed on Dec. 23, 2003, now Pat. No. 6,929,311, which is a continuation of application No. 10/177,728, filed on Jun. 21, 2002, now Pat. No. 6,669,271.

(60) Provisional application No. 60/300,232, filed on Jun. 22, 2001.

(51) Int. Cl.
  *B62D 33/00* (2006.01)
(52) U.S. Cl. .................... 296/182.1; 296/186.1; 296/29
(58) Field of Classification Search ............ 296/182.1, 296/184.1, 186.1, 203.03, 204, 29, 183.1
See application file for complete search history.

(56) References Cited

U.S. PATENT DOCUMENTS

| 2,600,140 | A | * | 6/1952 | Torseth ................. 296/186.1 |
| 3,848,920 | A | | 11/1974 | Linhart et al. |
| 3,995,405 | A | * | 12/1976 | Peterson ................ 52/800.15 |
| 4,145,080 | A | | 3/1979 | Miller et al. |
| 4,356,675 | A | * | 11/1982 | Reicherts ................ 52/264 |
| 4,437,699 | A | | 3/1984 | Lewis et al. |
| 4,612,744 | A | | 9/1986 | Shamash |
| 4,787,670 | A | | 11/1988 | Bentz |
| 4,940,279 | A | | 7/1990 | Abott et al. |
| 5,026,112 | A | | 6/1991 | Rice |
| 5,041,318 | A | | 8/1991 | Hulls |
| 5,185,193 | A | * | 2/1993 | Phenicie et al. ............. 52/536 |
| 5,345,737 | A | | 9/1994 | Latchinian |
| 5,403,062 | A | | 4/1995 | Sjostedt et al. |
| 5,449,081 | A | | 9/1995 | Sjostedt et al. |
| 5,553,906 | A | * | 9/1996 | Kunz .................. 296/203.03 |
| 5,588,693 | A | * | 12/1996 | Higginson et al. ........ 296/186.1 |

(Continued)

FOREIGN PATENT DOCUMENTS

CA   2097340   6/1997

(Continued)

*Primary Examiner*—Kiran B. Patel
(74) *Attorney, Agent, or Firm*—Fay, Sharpe, Fagan, Minnich & McKee, LLP

(57) ABSTRACT

A trailer body includes left and right bottom rails and left and right top rails all parallel to each other. A floor extends between the left and right bottom rails. A left vertical sidewall is defined between the left bottom rail and the left top rail. A right vertical sidewall is defined between the right bottom rail and the right top rail. The sidewalls are defined by a plurality of abutted extruded wall panels that extend vertically between the respective bottom and top rails. The floor is optionally defined by a plurality of abutted and interconnected one-piece extruded floor panels that extend between the left and right bottom rails. The wall and/or floor panels can include an I-beam post/cross-member defined in the extrusion profile. The panels can also define half I-beam post/cross-members so that adjacent abutted panels cooperate to define additional full I-beam post/cross-members.

15 Claims, 9 Drawing Sheets

U.S. PATENT DOCUMENTS

| | | | |
|---|---|---|---|
| 5,608,999 | A | 3/1997 | McNamara |
| 5,613,726 | A | 3/1997 | Hobbs et al. |
| 5,664,826 | A * | 9/1997 | Wilkens .................. 296/186.1 |
| 5,681,095 | A * | 10/1997 | Martin .................... 296/183.2 |
| 5,715,641 | A | 2/1998 | Hall, Jr. |
| 5,741,042 | A * | 4/1998 | Livingston et al. ............ 296/29 |
| 5,791,726 | A * | 8/1998 | Kaufman ................. 296/182.1 |
| 5,794,397 | A * | 8/1998 | Ludwig ................... 52/506.08 |
| 5,852,904 | A * | 12/1998 | Yu et al. ..................... 52/220.7 |
| 5,860,264 | A * | 1/1999 | Gephart et al. ............ 52/656.4 |
| 5,860,693 | A | 1/1999 | Ehrlich |
| 5,876,089 | A | 3/1999 | Ehrlich |
| 5,934,741 | A * | 8/1999 | Beukers et al. .......... 296/181.6 |
| 5,938,274 | A | 8/1999 | Ehrlich |
| 5,992,117 | A | 11/1999 | Schmidt |
| 5,997,076 | A | 12/1999 | Ehrlich |
| 6,095,715 | A | 8/2000 | Hulls |
| 6,161,347 | A | 12/2000 | Yu et al. |
| 6,199,939 | B1 | 3/2001 | Ehrlich |
| 6,224,125 | B1 | 5/2001 | McCormack |
| 6,224,142 | B1 | 5/2001 | McCormack |
| 6,237,989 | B1 * | 5/2001 | Ammerlaan et al. .......... 296/29 |
| 6,290,285 | B1 | 9/2001 | McCormack |
| 6,349,988 | B1 | 2/2002 | Foster et al. |
| 6,412,854 | B1 | 7/2002 | Ehrlich |
| 6,425,626 | B1 * | 7/2002 | Kloepfer .................. 296/186.1 |
| 6,446,396 | B1 | 9/2002 | Marangoni et al. |
| 6,497,451 | B1 | 12/2002 | Jones et al. |
| 6,513,297 | B1 * | 2/2003 | Kloepfer ..................... 52/588.1 |
| 6,669,271 | B1 | 12/2003 | Booher |
| 6,719,360 | B1 * | 4/2004 | Backs ...................... 296/186.1 |
| 2002/0109377 | A1 | 8/2002 | Ehrlich |
| 2004/0134162 | A1 * | 7/2004 | Douglas ..................... 52/741.1 |
| 2005/0108964 | A1 * | 5/2005 | Brinkkotter .................. 52/455 |

FOREIGN PATENT DOCUMENTS

EP            0 079 068       5/1993

* cited by examiner

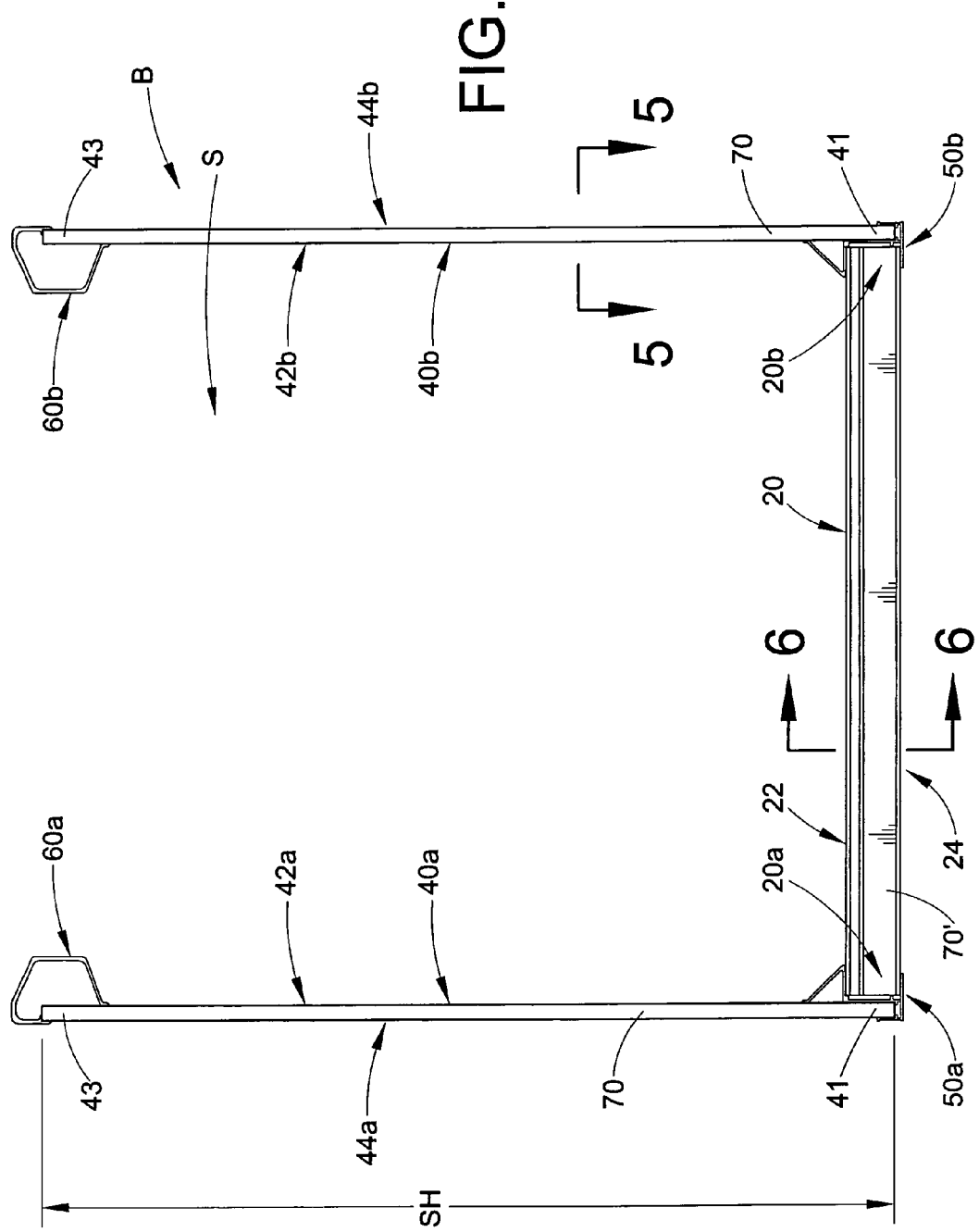

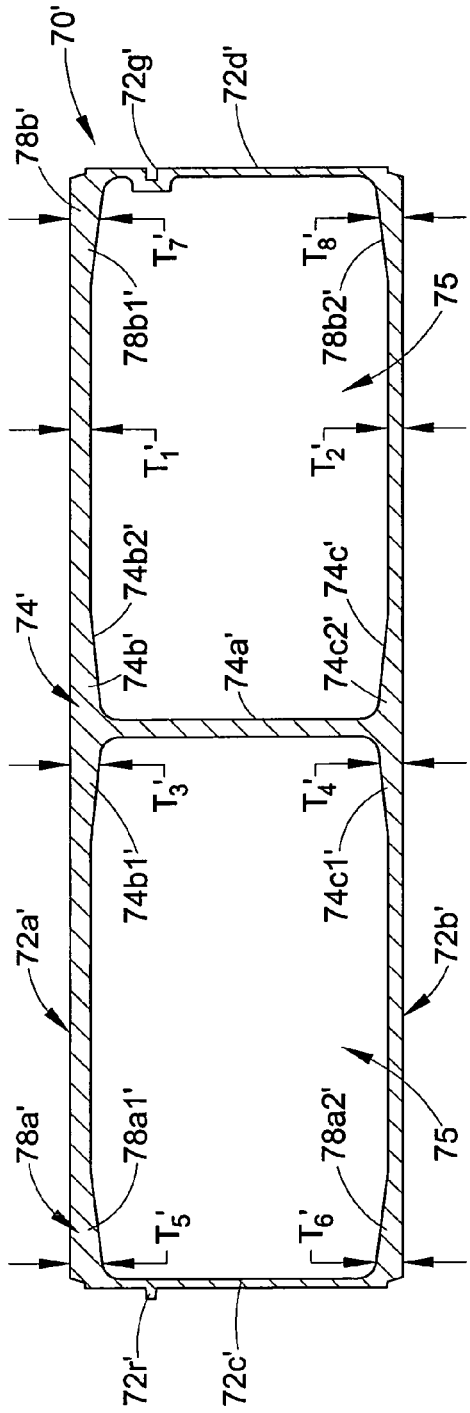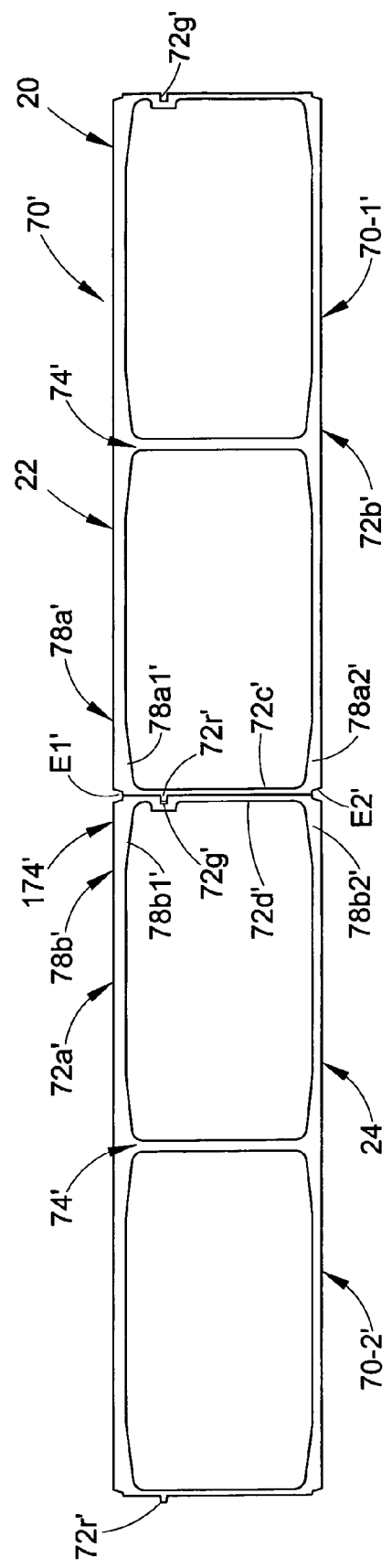

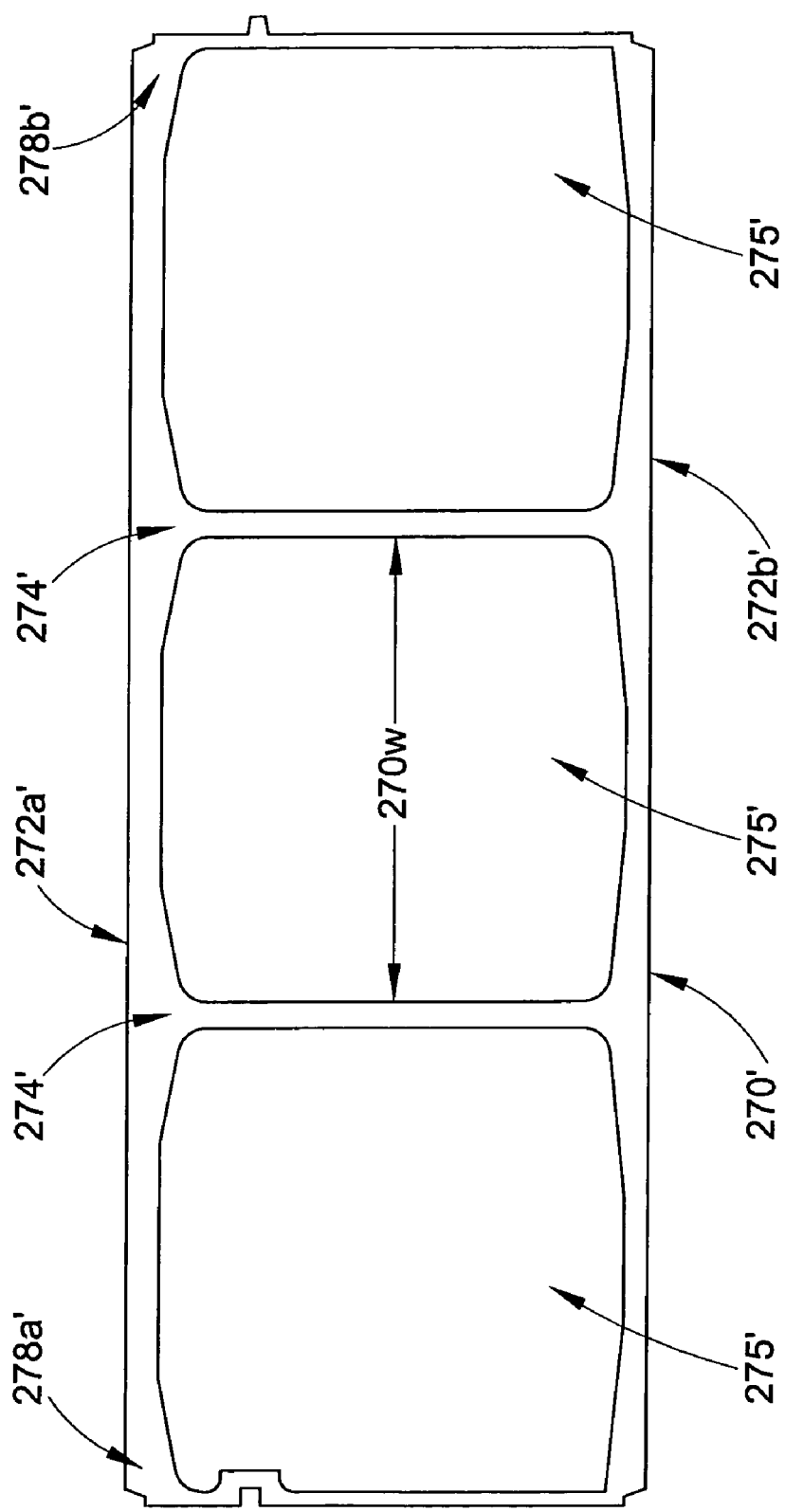

TRAILER AND TRAILER BODY CONSTRUCTION AND EXTRUDED PANEL FOR SAME

CROSS-REFERENCE TO RELATED APPLICATIONS

This application is a continuation-in-part of U.S. application Ser. No. 10/745,248 filed Dec. 23, 2003 now U.S. Pat. No. 6,929,311, which is a continuation of U.S. application Ser. No. 10/177,728 filed Jun. 21, 2002, now U.S. Pat. No. 6,669,271, which claims priority from and benefit of the filing date of U.S. provisional application Ser. No. 60/300,232 filed Jun. 22, 2001, and all of said prior applications are hereby expressly incorporated by reference herein.

BACKGROUND

Within the heavy-duty trailer design and manufacturing industry, it is desired that a trailer have maximum load carrying capacity and strength/durability. These trailers, such as dump trailers, tipper trailers, walking floor trailers, and others (referred to generally herein as bulk commodity trailers), traditionally have been produced in various lengths and capacities. The trailers generally include a trailer body that defines a cargo-retaining space supported on a chassis. Ground-engaging wheel assemblies are connected to the chassis and movably support the chassis and trailer body on the ground. A retractable landing gear assembly is connected to the chassis or trailer body at a location spaced from the wheel assemblies to support the front of the trailer chassis on the ground when it is not supported by a tractor vehicle used to pull the trailer.

The trailer body, itself, comprises a floor structure. Left and right sidewalls and front and rear walls project vertically upward relative to the floor and, together with the floor, define cargo-retaining space for bulk commodities such as sand, grain, garbage, coal, scrap metal, etc. The rear wall provides or includes or defines a gate that selectively blocks and opens a payload discharge opening.

The top of bulk commodity trailer bodies is typically left open, but a "center-pipe" is often located near the longitudinal midpoint of the trailer body and extends transversely between and interconnects the upper edges of the left and right sidewalls. This center-pipe is used to add strength to the trailer body and, specifically, to prevent outward bowing of the left and red sidewalls due to the weight of the load in the cargo-retaining space. This center-pipe has been found to be inconvenient in that it obstruct the open top of the trailer which impedes loading and can prevent full loading, it can inhibit the dumping of the payload from the cargo-retaining area, and if the center-pipe is accidentally contacted and damaged during loading operations, it can transfer this force to the trailer sidewalls and cause damage thereto.

The trailer body is often pivotally mounted to the chassis and, in such case, the trailer comprises a hydraulic actuator or the like for pivoting the body relative to the chassis for dumping the cargo from the cargo-retaining space through the open rear gate. In other "frameless dump" trailer arrangements, the trailer includes a more limited chassis, and dumping is carried out by pivoting the trailer body and portions of the chassis about a rear set of ground-engaging wheels as is well-known in the art. Other trailer bodies have a live or "walking" floor that expels the bulk commodity payload from the open rear gate of the cargo-retaining space without any tipping of the trailer body. Still other trailer bodies are defines as "tipper" trailers, where the trailer body and chassis are supported on a platform and inclined as a unit so that the bulk commodity payload spills through the open rear gate.

While a variety of metallic materials have been employed to construct these trailer bodies, lightweight and high-strength metals, such as aluminum and various alloys thereof (referred to herein simply as "aluminum", have become favored manufacturing stock because of the high strength-to-weight ratio, which allows for lower empty weight and optimum payload capacity, and also because of ease of manufacture and maintenance.

Another main advantage to use of aluminum in trailer and trailer body manufacturing is its resistance to corrosion. New ice and snow control techniques including use of liquid ice and snow melting compounds comprising magnesium chloride and/or calcium chloride have exacerbated the corrosion of conventional trailers having steel components in the chassis and/or trailer body. Liquid magnesium chloride and other compounds used for ice/snow control are many times more corrosive to steel as compared to "road salt" as we know it, e.g., sodium chloride. Also, these liquid ice/snow control compounds appear to act as a catalyst to the damaging electrolysis/galvanic reaction between steel and aluminum trailer components. These new ice and snow control techniques are becoming more popular due to a cost advantage and are causing extensive damage to steel components of truck trailers. This phenomenon is documented in the article "Corrosion Explosion" appearing in the September 2004 issue of Trailer/Body Builders, pps. 38–45. Because use of these new ice/snow control compounds is increasing, construction of durable, corrosion resistant aluminum trailers and trailer bodies is becoming increasingly popular and important.

To insure proper functionality, the interior sidewalls of a trailer body must be smooth to allow the payload to be dumped. Traditionally, trailer body sidewalls were defined using plates or rolled metal sheets, with any required support members being externally located to allow the cargo-retaining space to have the required smooth inward-facing walls. The external support members, and the sheet sidewall extending therebetween, caused the sidewalls to have an undulating exterior surface which has been found to increase wind drag and fuel consumption while also having a negative impact on handling in windy conditions.

More recently, to reduce wind-drag, the sidewalls of trailer bodies have been constructed using multiple interconnected extruded panels having smooth internal and external surfaces. Some of these trailer bodies include sidewalls that are defined by a plurality of extruded aluminum panels that extend length-wise the entire length of the trailer body, from the front wall to the rear wall. The long uninterrupted horizontal length of these panels, e.g., 48 feet or more, has led to problems in durability and strength. In particular, trailer body sidewalls constructed from a stacked plurality of horizontally extended panels are susceptible to weakness and, thus, outward bowing near the axial midpoint of the trailer body. Bowed sidewalls are highly undesired and are aesthetically displeasing and cause reduced confidence in the strength of the trailer body.

The floors of trailer bodies are constructed using plates or sheets of steel or aluminum or other material supported on a plurality of cross-members arranged transverse to the longitudinal axis of the trailer and spaced and intervals along the length of the trailer body. The cross-members are typically 3–5 inches high and remain exposed on the external underside of the trailer. As such, these cross-members and the floor supported thereon define an undulating exterior surface that with deep pockets between the cross-members. This exterior floor surface increases wind drag, collects dirt, ice/snow, corrosive ice/snow removal materials (e.g., sodium chloride, calcium chloride, magnesium chloride), asphaltic paving materials and other foreign matter. In the case of accumulated ice and snow, the collected material often hangs from the cross-members and further increases wind drag. The wind drag and accumulation of foreign matter are both highly undesirable conditions in that they increase weight, fuel consumption and/or negatively impact handling. Also, accumulated foreign matter can become dislodged during movement of the trailer on roadways which is undesirable for vehicles following the trailer.

SUMMARY

In accordance with a first aspect of the present development, a trailer body comprises: left and right bottom rails extending parallel to each other and parallel to a longitudinal axis, and left and right top rails extending parallel to each other and parallel to the longitudinal axis. The left and right top rails are spaced vertically above said left and right bottom rails, respectively. A horizontal floor extends between said left and right bottom rails and comprises a plurality of abutted and interconnected one-piece extruded floor panels that each extend horizontally between the left and right bottom rails transversely relative to said longitudinal axis. A left vertical sidewall is defined between said left bottom rail and said left top rail. The left sidewall comprises a plurality of abutted and interconnected one-piece extruded wall panels that extend vertically between said left bottom rail and said left top rail. A right vertical sidewall is defined between said right bottom rail and said right top rail. The right sidewall comprises a plurality of the one-piece extruded wall panels that extend vertically between the right bottom rail and the right top rail. The extruded floor panels and the extruded wall panels each comprise inner and outer faces interconnected by first and second spaced-apart end walls and at least one web that spans a space between the inner and outer faces. The first and second end walls and the at least one web of the extruded floor panels extend horizontally between the left and right bottom rails. The first and second end walls and the at least one web of the wall panels of the left sidewall extend vertically between the left bottom rail and the left top rail. The first and second end walls and the at least one web of the wall panels of the right sidewall extend vertically between the right bottom rail and the right top rail.

In accordance with a second aspect of the present development, a trailer body comprises left and right bottom rails extending parallel to each other and parallel to a longitudinal axis, and left and right top rails extending parallel to each other and parallel to the longitudinal axis. The left and right top rails are spaced vertically above the left and right bottom rails, respectively. A horizontal floor extends between said left and right bottom rails. A left vertical sidewall is defined between the left bottom rail and the left top rail. The left sidewall comprises a plurality of abutted and interconnected one-piece extruded wall panels that extend vertically between the left bottom rail and the left top rail. A right vertical sidewall is defined between the right bottom rail and the right top rail. The right sidewall comprises a plurality of the one-piece extruded wall panels that extend vertically between the right bottom rail and the right top rail. The extruded wall panels each comprise an inner face and an outer face interconnected by first and second spaced-apart end walls and at least one web that spans a space between the inner and outer faces. The first and second end walls and the at least one web of the wall panels of the left sidewall extend vertically between the left bottom rail and the left top rail. The first and second end walls and the at least one web of the wall panels of the right sidewall extend vertically between the right bottom rail and the right top rail.

In accordance with another aspect of the development, an extruded panel for a trailer wall or floor comprises: an inner face; an outer face arranged parallel to the inner face; first and second parallel spaced-apart end walls; and, at least one web located between the first and second spaced-apart end walls and that spans a space between the inner and outer faces. The at least one web and the inner and outer faces of each extruded wall panel define a primary I-beam member in a profile of the extruded panel. The primary I-beam member comprises first and second flanges defined by portions of the inner and outer faces that are thicker adjacent the at least one web and that taper in thickness as a distance from said at least one web increases.

In accordance with another aspect of the development, a panel assembly usable as a wall or floor of a trailer comprises a plurality of adjacent extruded aluminum panels interconnected by welding. Each of the panels comprises: (i) an inner face; (ii) an outer face arranged parallel to the inner face; (iii) first and second parallel spaced-apart end walls; and, (iv) at least one web located between the first and second spaced-apart end walls and that spans a space between the inner and outer faces. The at least one web and the inner and outer faces of each extruded wall panel define a primary I-beam member in a profile of each of the extruded panels. The primary I-beam member comprises first and second flanges defined by portions of the inner and outer faces that are thicker adjacent the at least one web and that taper in thickness as a distance from the at least one web increases.

BRIEF DESCRIPTION OF DRAWINGS

The present development comprises various components and arrangements of components, and is constructed according to various steps and arrangements of steps, preferred embodiments of which are disclosed herein with reference to the drawings, wherein:

FIG. 3 is a sectional view of the trailer as taken along line 3—3 of FIG. 2;

FIG. 6 is a sectional view as taken along line 6—6 of FIG. 3 of a single floor panel formed in accordance with the present development;

FIG. 6A is similar to FIG. 6 but shows first and second floor panels interconnected with each other to define a trailer floor structure;

FIG. 7 illustrates an alternative floor panel defined in accordance with the present development.

DETAILED DESCRIPTION

Figure 1:
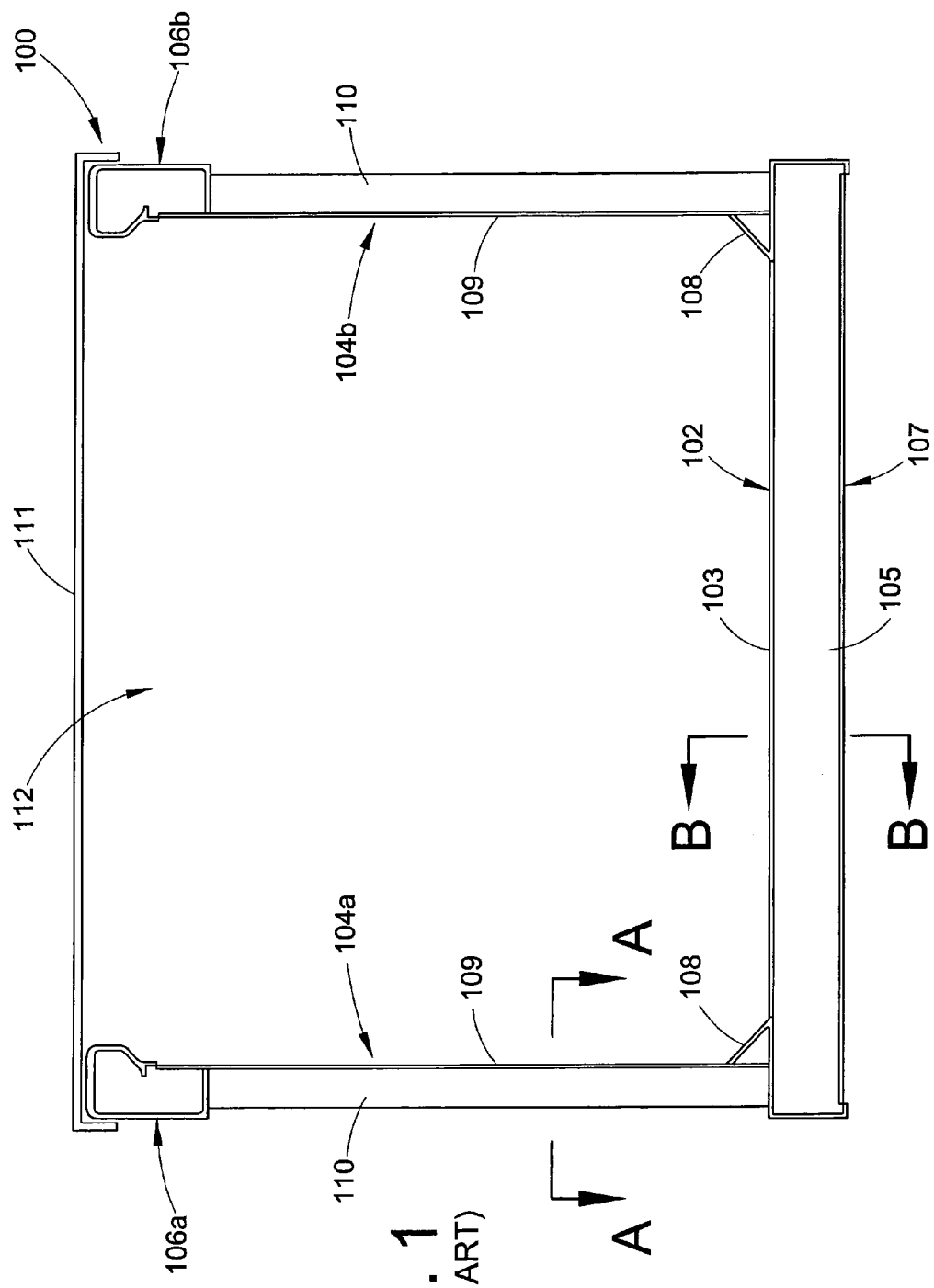
FIG. 1 is a sectional view of a prior art trailer body.

FIG. 1 illustrates a cross-section of a prior art trailer body 100. The trailer body 100 comprises a floor 102 and parallel left and right walls 104a,104b welded to and projecting vertically upward on opposite lateral (left and right) sides of the floor 102. Braces 108 are used to reinforce the connections between the sidewalls 104a,104b and the floor. Left and right top rails 106a,106b are connected to and extend along the lengths of the left and right sidewalls 104a,104b, respectively. Axially spaced-apart front and rear walls (not shown) extend perpendicularly between the sidewalls 104a, 104b at opposite ends thereof and cooperate with the sidewalls and floor 102 to define a cargo-retaining space 112 for holding bulk commodities such as sand, coal, garbage, salt, etc.

Figure 1A:
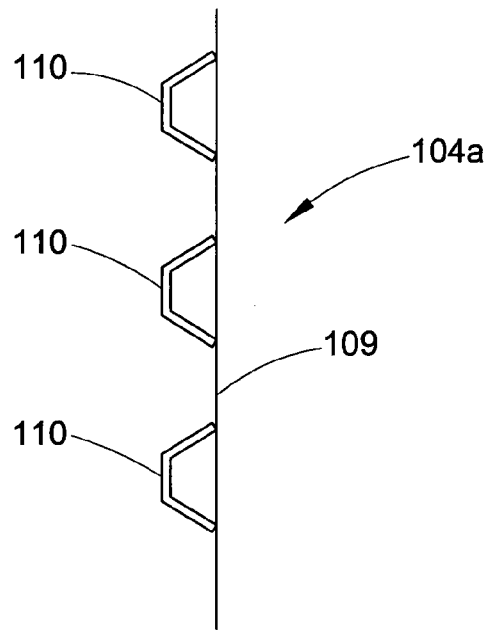
FIG. 1A is a sectional view of the sidewall as taken along line A—A of FIG. 1.
Figure 1B:
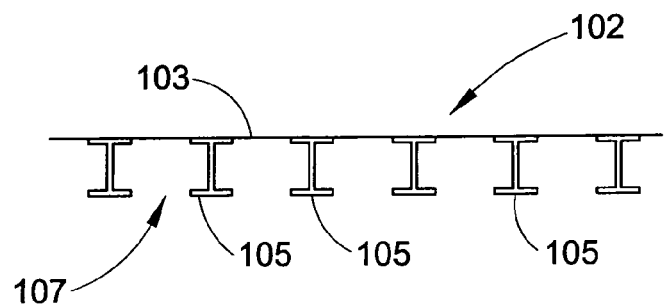
FIG. 1B is a sectional view of the floor as taken along line B—B of FIG. 1.
Figure 1C:
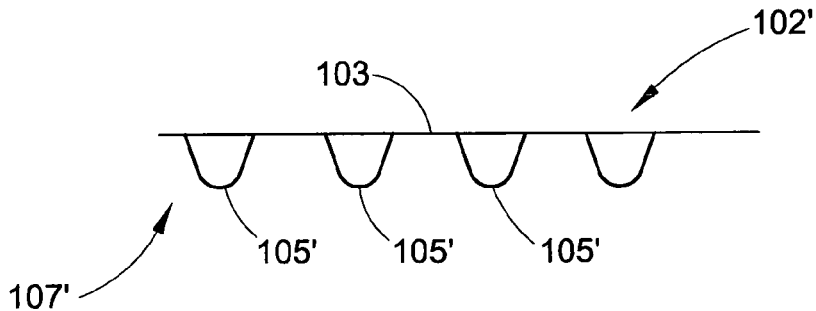
FIG. 1C is similar to FIG. 1B but shows an alternative known floor structure.

The left and right sidewalls 104a,104b of the prior art trailer body 100 have a well-known sheet-and-post construction comprising a sheet/plate material 109 (e.g., ¼" aluminum sheet) supported on a plurality of vertical posts 110. As can be seen in FIG. 1A, the sheet/plate material 109 provides a smooth inner surface as required for dumping a bulk commodity payload, but the opposite, outer faces of the sidewalls 104a,104b are uneven and undulating due to the presence of the posts 110 as has been found to be highly undesirable for at least the reasons recited above in the discussion of the prior art. Referring to FIG. 1B, the floor 102 of the prior art trailer body 100 is constructed from a sheet or plate material 103 (e.g., ¼" aluminum sheet) supported on top of and welded to a plurality of I-beam cross-members 105 that are typically defined as aluminum extrusions. FIG. 1C shows a common alternative floor structure 102' wherein the sheet material 103 is supported on and welded to a plurality of U-shaped extruded aluminum cross-members 105'. In either case, it can easily be seen in FIGS. 1B and 1C that the floor 102,102' comprises a smooth upper (inner) surface as required for dumping a bulk commodity payload but, in contrast, comprises an undulating bottom (outer) surface 107,107' which has been found to be highly undesirable for at least the reasons recited above in the discussion of the prior art.

Referring again to FIG. 1, the top of the trailer body 100 is open, but a center-pipe or brace 111 extends between and interconnects the sidewalls 104a,104b near the longitudinal mid-point of the trailer body 100 to prevent/limit outward bowing of the sidewalls relative to each other. As noted above, the center-pipe can sometimes obstruct loading of cargo and prevents tamping of the load near the longitudinal mid-point of the trailer body. Also, in particular when garbage is being unloaded, part of the load can become entangled on the center-pipe.

Figure 2:
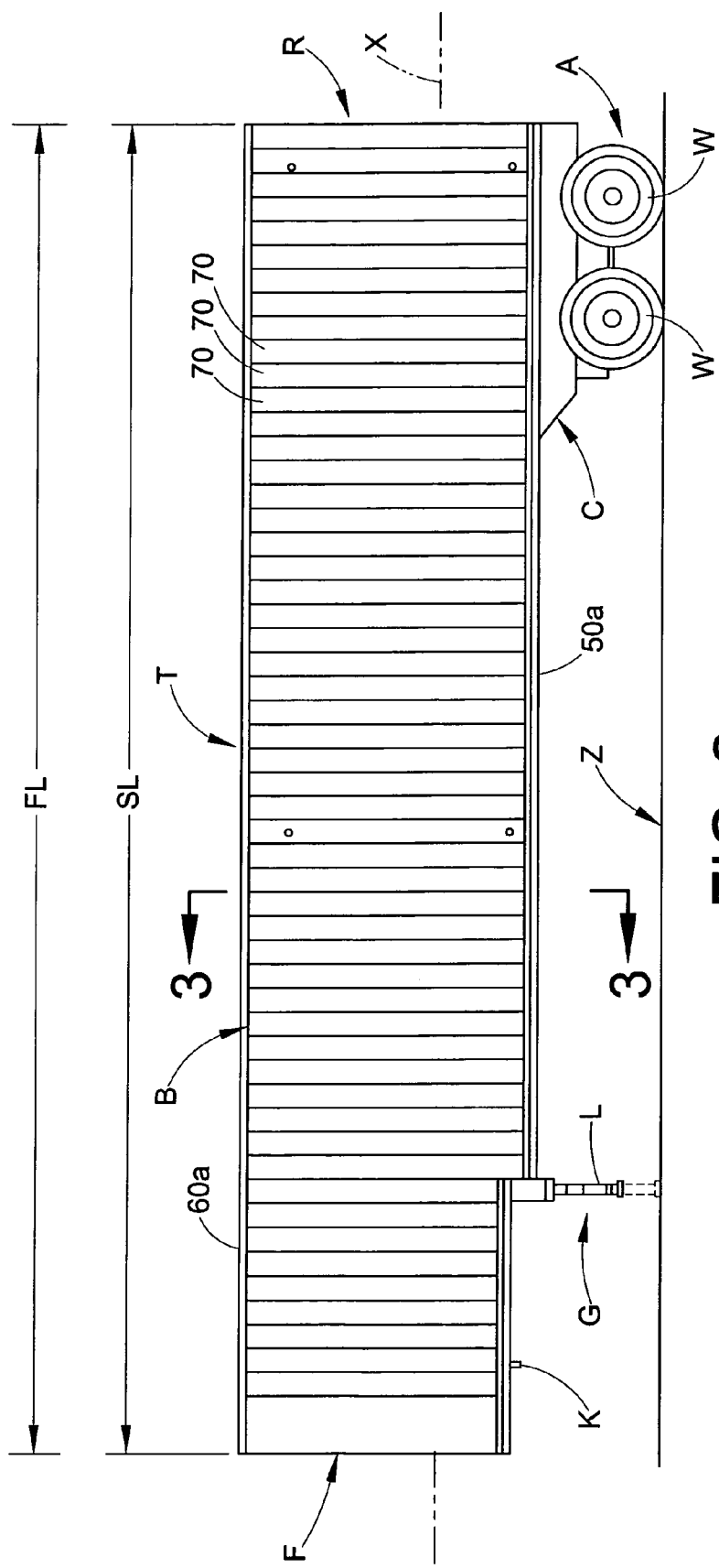
FIG. 2 shows an example of a trailer formed in accordance with the present development.

FIG. 2 shows one example of a trailer T constructed in accordance with the present development. The trailer T comprises a chassis C (which can be steel or aluminum or another material) and a body B supported on the chassis. An axle/wheel subassembly A is connected to the chassis C at a rear end of the trailer and comprises at least one set of left and right wheel/tire assemblies W that rollably support the chassis on the ground Z. The forward end of the trailer T comprises a kingpin K adapted for connection to a fifth-wheel of a tractor or other vehicle used to pull the trailer. The trailer T further comprises a landing-gear assembly G connected to the chassis C and/or the body B. The landing-gear assembly G comprises a pair of legs L that are selectively lowered into contact with the ground Z (as shown in phantom lines) to support the forward end of the trailer T when the trailer is not connected to a tractor. The legs L are raised out of contact with the ground Z when the trailer is operatively connected to a tractor. The trailer body B comprises axially spaced-apart front and rear walls F,R. The rear wall R is typically constructed as or comprising a tail gate that selectively opens to allow bulk commodities to be dumped from the trailer body therethrough. The trailer T illustrated in FIG. 2 provides only one example of a trailer constructed in accordance with the present development, and it is not intended that the present development be limited to the exact trailer structure shown in FIG. 2.

FIG. 3 shows a sectional view of the body B of trailer T as taken along line 3—3 of FIG. 2. There, it can be seen that the trailer body B comprises a floor 20 and left and right parallel sidewalls 40a,40b that project vertically upward relative to the floor 20 on opposite lateral (left and right) sides 20a,20b thereof. The floor 20, sidewalls 40a,40b and front and rear walls F,R (FIG. 2) define an open-top cargo-retaining space S for holding a payload of bulk commodity material such as sand, coal, grain, garbage, salt, and/or the like. As shown in FIG. 2, the sidewalls 40a,404b each defines a maximum sidewall axial length SL parallel to a longitudinal axis X (FIG. 2) of the trailer body between the front and rear walls F,R.

As described in more detail below, left and right bottom rails 50a,50b are secured to the opposite lateral sides 20a, 20b of the floor 20 and extend at least the entire axial length of the floor. The lower edges 41 of left and right sidewalls 40a,40b are seated in the left and right bottom rails 50a,50b, respectively, and the bottom rails 50a,50b also extend at least the entire axial length SL of the sidewalls 40a,40b. The upper edges 43 of the left and right sidewalls 40a,40b are capped by respective left and right top rails 60a,60b that also extend at least the entire axial length SL of the sidewalls.

Figure 4B:
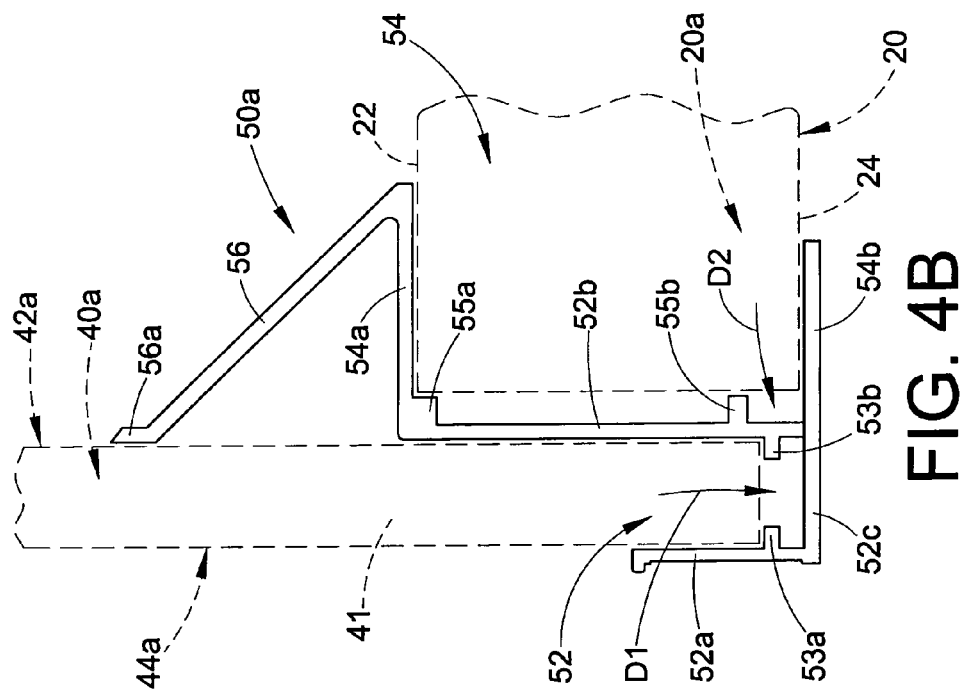
FIG. 4B is a sectional view of the left bottom rail of the trailer of FIG. 2 (the right bottom rail being a mirror image)
Figure 4A:
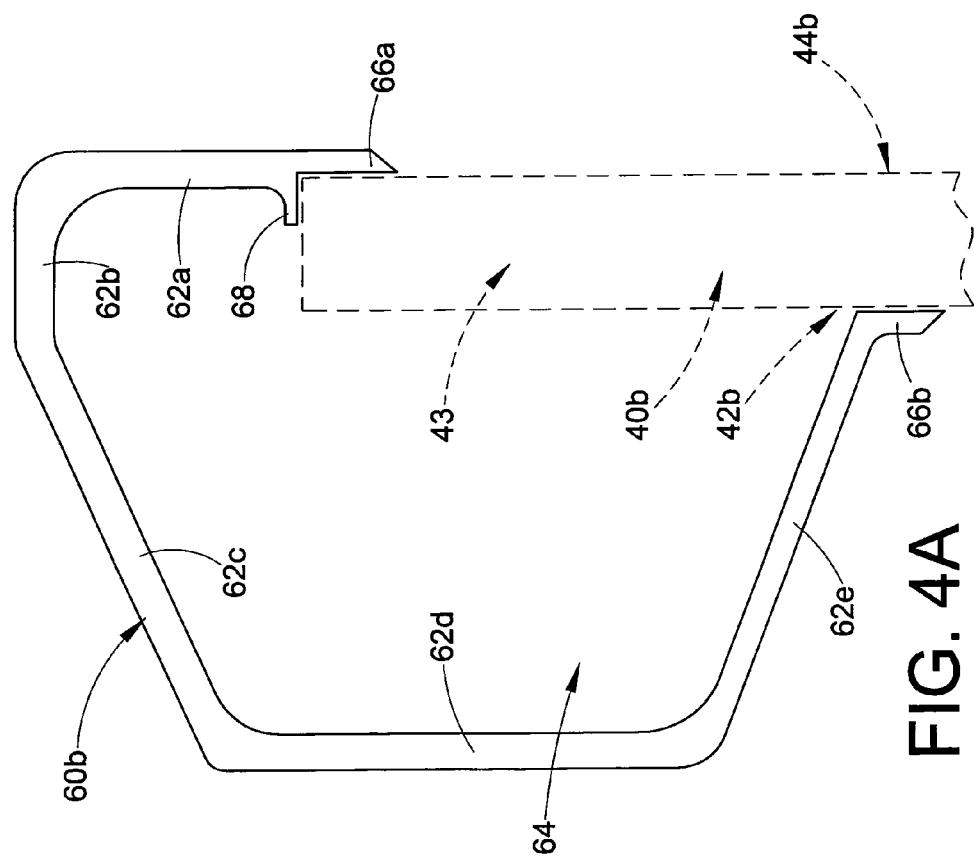
FIG. 4A is a sectional view of the right top rail of the trailer of FIG. 2 (the left top rail being a mirror image)

With reference also to FIG. 4A, the top rails 60a,60b are preferably defined as monolithic members that extend at least the axial length SL of the sidewalls 40a,40b to add strength and rigidity to the sidewalls and to cap same. Most preferably, the top rails 60a,60b are defined as aluminum extrusions using suitable aluminum alloy such as 6061-T6 or another suitable aluminum alloy. The extrusion profile of the right top rail 60b is shown in FIG. 4A, and the left top rail 60a is identically structured but a mirror image of the illustrated right top rail. The top rail 60b comprises a plurality of walls 62a–62e that define a hollow interior space 64. Flat flanges/tabs 66a,66b are located at opposite ends of the walls 62a–62e and are adapted to abut the outer and inner faces 44b,42b of the sidewall 40b (the sidewall 40b is shown in broken lines). The tabs 66a,66b are laterally spaced apart and parallel to each other so that the upper edge 43 of sidewall 40b is received therebetween. The tabs 66a,66b are also preferably vertically offset from each other as shown to facilitate insertion of the sidewall 40b therebetween. The top rail 60b comprises a stop projection 68 against which the sidewall 40b is abutted when the top rail 60b is fully received onto the sidewall 40b. The tabs 66a,66b are permanently connected to the sidewall 40b by suitable means, preferably a continuous weld or a series of separate welds, although adhesive and/or other means such as fasteners can be used. Left top rail 60a is connected to left sidewall 40a in the same (but mirror image) manner.

Referring now to FIG. 4B, the bottom rails 50a,50b are preferably also defined as monolithic members that extend at least the full axial length SL of the sidewalls 40a,40b and floor 20 to add strength and rigidity to the sidewalls and floor and to support same along their respective full axial lengths. Most preferably, the bottom rails 50a,50b are each defined as an aluminum extrusion using suitable aluminum alloy such as 6061-T6 or another suitable aluminum alloy.

An example extrusion profile of the left bottom rail 50a is shown in FIG. 4B; the right bottom rail 50b is identically structured but defined as a mirror image of the illustrated left bottom rail. The left bottom rail 50a comprises a first channel 52 that opens upwardly and that receives and retains and supports the lower edge 41 of sidewall 40a, and a second channel 54 that opens transversely relative to the first channel 52 and that receives and retains and supports the left lateral edge 20a of the floor 20. More particularly, the first, upwardly-open channel 52 is U-shaped and defined by first and second sidewalls 52a,52b interconnected by an end wall 52c. The second, laterally-open channel 54 is U-shaped and defined by first and second sidewalls 54a,54b that are interconnected by an end wall 54c defined by at least part of the sidewall 52b of the first channel, i.e., at least part of the sidewall 52b of first channel 52 also provides the structure for the end wall 54c of the second channel 54. As such, part or all of the sidewall 52b is common to both channels 52,54. In the illustrated embodiment, the sidewalls 52a,52b of channel 52 are parallel to each other, and the sidewalls 54a,54b of channel 54 are parallel to each other. In the embodiment shown in FIG. 4B, the bottom rail 50a further comprises a clean-out wall 56 that extends from sidewall 54a toward the inner face 42a of trailer body sidewall 40a (shown in broken lines), preferably at about a 45 degree angle, and that terminates in a flat flange/tab 56a that is in vertical alignment with the channel sidewall 52b and positioned to be connected to the inner face 42a of wall 40a, preferably by a continuous weld or a series of separate welds, or alternatively by adhesive and/or fasteners. The clean-out wall 56 prevents accumulation of the bulk commodity cargo at the 90 degree interface between floor 20 and wall 40a during dumping operations.

With continuing reference to FIG. 4B, the sidewalls 52a,52b of first channel 52 are spaced-apart from each other so as to receive the lower edge of sidewall 40a closely therebetween, i.e., with minimal clearance, with wall 52a contacting outer face 44a and wall 52b contacting inner face 42a of wall 40a. Wall 52a of channel 52 is fixedly secured to outer face 44a of trailer sidewall 40a by suitable means such as a preferred continuous weld that extends the full axial length SL of the sidewall 40a or by a series of welds or, alternatively, by adhesive and/or fasteners. It is most preferred that the sidewall 40a be prevented from contacting end wall 52c by at least one stand-off projection, shown here as first and second stand-off tabs 53a,53b that project into channel 52 from sidewalls 52a,52b. Tabs 53a,53b allow water or sand or other flowable material to drain as indicated by arrow D1 into channel 52 from inside wall 40a, and channel 52 is open adjacent rear wall R of trailer T and/or at other locations so that the water or other material can drain from bottom rail 50a onto ground Z. Right sidewall 40b is connected to right bottom rail 50b in the same (but mirror-image) manner.

In a similar manner, the sidewalls 54a,54b of second channel 54 are spaced-apart from each other to receive the left edge 20a of floor 20 closely therebetween with minimal clearance, with wall 54a contacting upper surface 22 and wall 54b contacting lower surface 24 of floor 20. Wall 54a of channel 54 is fixedly secured to upper face 22 of floor 20 by suitable means such as a preferred continuous weld that extends the full axial length of floor 20 or by a series of welds or by adhesive and/or fasteners. Optionally, the wall 54b is fixedly secured to lower face floor 20 in the same or another manner, but this is not required. It is most preferred that the floor 20 be prevented from contacting wall end wall 54c of channel 54 by at least one stand-off projection, shown here as first and second stand-off blocks 55a,55b that project into channel 54. Block 55a is shown defined as part of the corner interface between walls 54a and 54c, while block 55b projects from wall 54c at a location spaced from wall 54b. Blocks 55a,55b allow water, sand or other flowable material to drain as indicated by arrow D2 into channel 54 from inside floor 20, and channel 54 is open adjacent rear wall R of trailer T and/or at other locations so that the water or other flowable material can drain from bottom rail 50a onto ground Z. The spacing of projection 55b from wall 54b is preferred to prevent projection 55b from impeding drainage flow $D_2$ from floor 20 into channel 54. The right edge 20b of the floor 20 is connected to the channel 54 of the right bottom rail 50b in the same (but mirror image) manner.

Figure 4C:
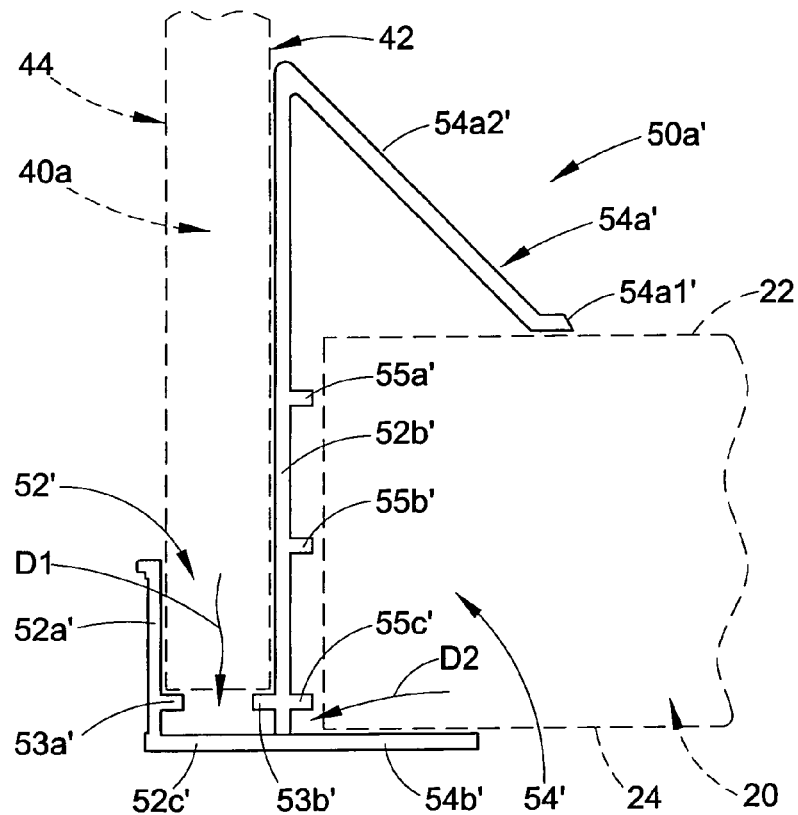
FIGS. 4C and 4D are similar to FIG. 4B but respectively show alternative bottom rail designs for the trailer of FIG. 2.

An alternative left bottom rail 50a' is shown in FIG. 4C; the corresponding right bottom rail (not shown) is identically structured but defined as a mirror image of the illustrated left bottom rail 50a'. Except as otherwise shown and/or described herein, the bottom rail 50a' is identical to the bottom rail 50a and, thus, like components are identified with like reference characters including a primed (') suffix. The channel 52' of bottom rail 50a' is substantially identical to channel 52 and receives and retains trailer sidewall 40a, and tabs 53a',53b' keep wall 40a spaced from bottom wall 52c' of channel 52' for drainage D1 as described above. Sidewall 52a' is fixedly secured to outside of trailer sidewall 40a by welding or other means as described above. A main distinction of the rail 50a' relative to the rail 50a is that the wall 54a' of second channel 54' includes two portions: (i) a first end tab/flange portion 54a1' located to receive the floor 20 closely between itself and the wall 54b'; and (ii) a second portion 54a2' that is angled relative to the first tab/flange portion 54a1' and that joins the wall 52b' adjacent trailer sidewall 40a. The second portion 54a2' of wall 54a' thus functions as a clean-out plate. The first end tab/flange portion 54a1' of wall 54' is fixedly secured to upper surface 22 of floor 20 by welding and/or other means as described above. Also, a weld, adhesive and/or other means can be used to fixedly secured the bottom rail 50a' to the inner face 42a of sidewall 40a at the junction of the walls 52b', 54a2' with the inner face 42a. The bottom rail 50a' comprises first, second and third stand-off blocks 55a',55b',55c' that project into channel 54', all connected to wall 52b'. Blocks 55a', 55b',55c' allow for drainage D2 as described above. The projections 55a',55b',55c' are spaced from wall 54b' so as not to impede drainage flow D2.

Figure 4D:
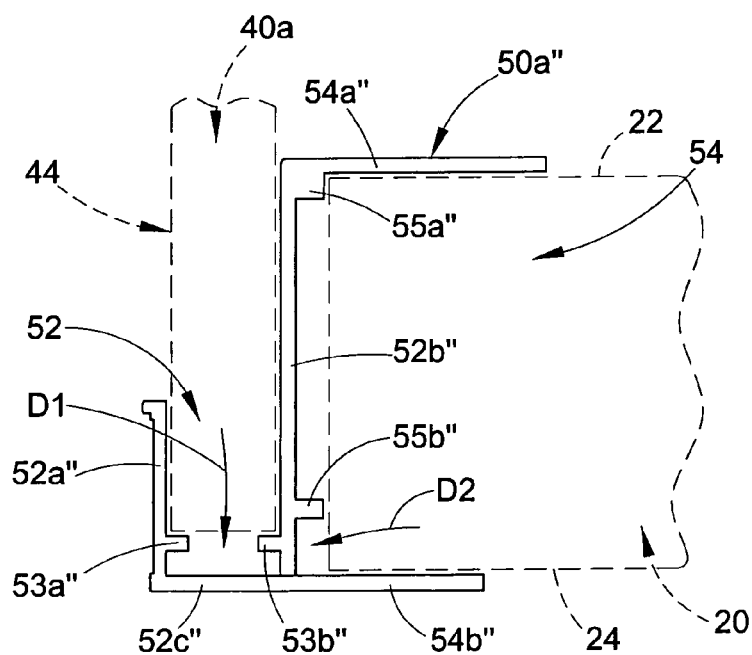

FIG. 4D illustrates another alternative left bottom rail 50a"; the corresponding right bottom (not shown) is identically structured but defined as a mirror image of the illustrated left bottom rail 50a". Except as otherwise shown and/or described herein, the bottom rail 50a" is identical to the bottom rail 50a and, thus, like components are identified with like reference characters including a primed (') suffix. More particularly, the alternative bottom rail 50a" is identical to the rail 50a, except that it does not include a clean-out plate 56 and, thus, further discussion of the alternative rail 50a" is not required for those of ordinary skill in the art.

Figures 5, 5A:
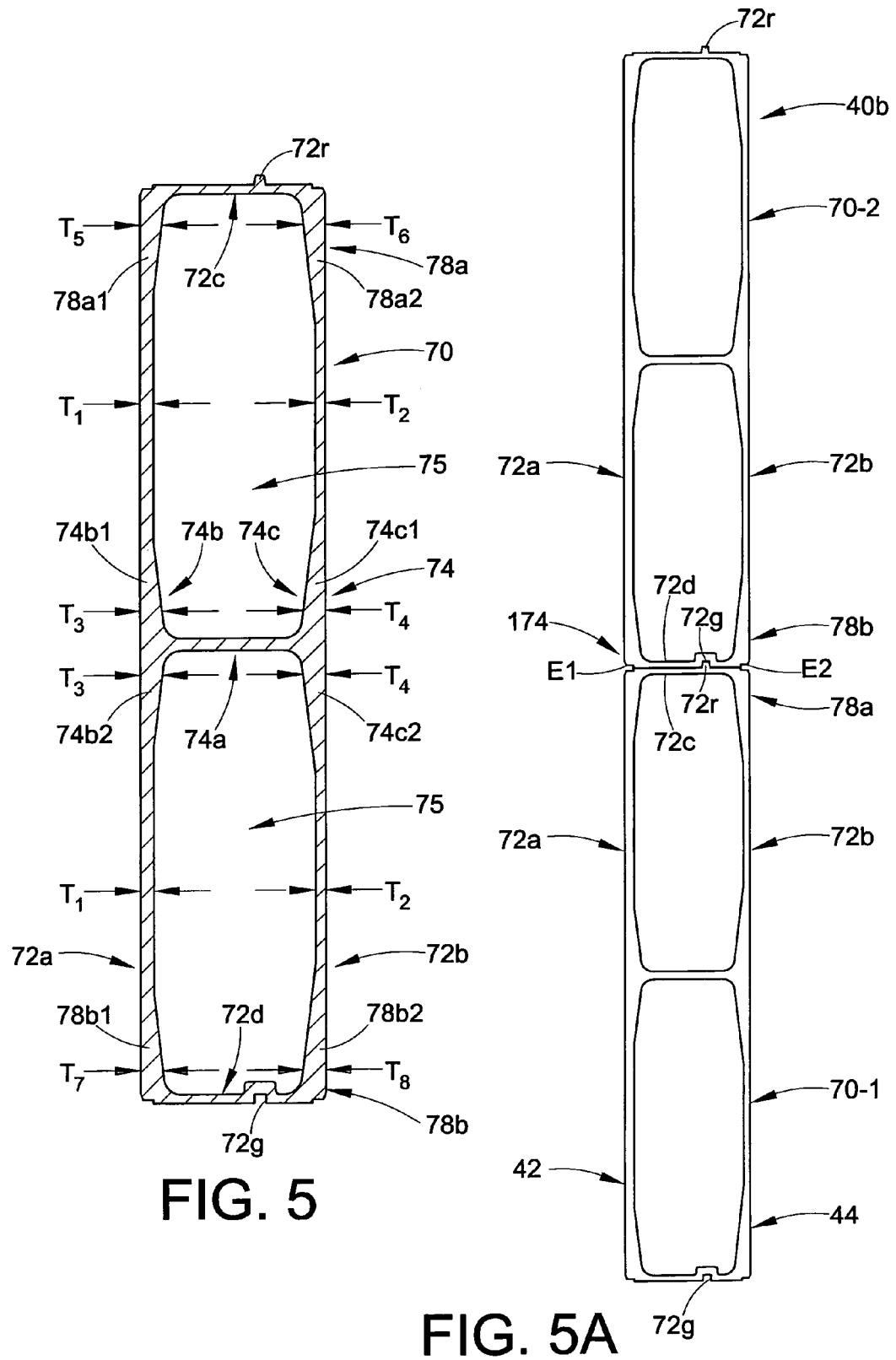
FIG. 5 is a sectional view as taken along line 5—5 of FIG. 3 of a single wall panel formed in accordance with the present development.
FIG. 5A is similar to FIG. 5 but shows first and second wall panels interconnected with each other to define a trailer wall structure.

As shown in FIG. 2, the left and right trailer sidewalls 40a,40b are constructed from a plurality of vertically oriented wall panels 70 abutted with each other and fixedly secured together by welding, adhesive and/or other suitable means. The vertical orientation of the panels 70 has been found to increase the strength of the sidewalls 40a,40b as compared to sidewalls constructed with lengthwise-extending panels. FIG. 5 is a sectional view as taken along line 5—5 of FIG. 3 and shows a single wall panel 70 formed in accordance with the present development. The panel 70 is preferably defined as a monolithic member, most preferably as an extrusion of aluminum alloy, such as 6061-T6 aluminum alloy or another suitable aluminum alloy, having the profile shown in FIG. 5. It is preferred that adjacent panels 70 of walls 40a,40b be secured to each other by welding, although use of an adhesive is contemplated and deemed without the scope of the present development. The panel 70 comprises a smooth planar inner wall 72a oriented toward inside of cargo-retaining space S of trailer body B, and a smooth planar outer wall 72b oriented toward outside of trailer body B. The walls 72a,72b lie in respective vertical planes and are arranged in parallel spaced-apart relation to each other. The inner and outer walls 72a,72b can have the same minimum thickness but, because the inner wall 72a is in contact with the bulk commodity cargo while the outer wall 72b is not, it is preferred that the inner wall 72a have a minimum thickness $T_1$ that is greater than the minimum thickness $T_2$ of outer wall 72b to reduce weight and material cost while providing the required strength where needed.

The inner and outer walls 72a,72b are joined by opposite first and second end walls 72c,72d which, in the illustrated embodiment, are arranged in parallel spaced-apart relation to each other in respective vertical planes. The end walls 72c,72d comprise respective mating conformations such as the illustrated male rib 72r and female groove 72g. As shown in FIG. 5A, the rib 72r and groove 72g are sized for close sliding receipt of the rib 72r of a first panel 70-1 into the groove 72g of a second panel 70-2 abutted with the first panel 70-1 so that a plurality of the vertically extending panels 70 define the walls 40a,40b. This mechanical connection of the wall panels 70-1,70-2 increases strength and facilitates a subsequent bonding operation by suitable means such as the preferred welding operation or, alternatively, adhesive and/or fasteners for permanently securing the panels to each other to define the walls 40a,40b. More particularly, as is also apparent in FIG. 5A, the panels 70-1,70-2 are defined so that when they are abutted to define a trailer wall 40a,40b, the abutted panels cooperate to define first and second vertically extending welding grooves E1,E2 each adapted to receive a weld bead, i.e., each panel 70-1,70-2 defines half of each groove E1,E2. Alternatively, the grooves E1,E2 can receive an adhesive used to permanently affix the panels to each other.

Referring again to FIG. 5, the panel 70 defines at least one primary I-beam post-member 74 in its profile. The one or more primary I-beam post-members 74 are preferably equally spaced between the end walls 72c,72d. The primary I-beam post-member 74 (only one illustrated in FIG. 5) comprises a support web 74a that spans the space between walls 72a,72b and first and second flanges 74b,74c arranged transversely relative to the support web 74a. Preferably the web 74a lies in a vertical plane and the flanges 74b,74c are perpendicularly connected to the web 74a. The flanges 74b and 74c have respective symmetrical first and second halves 74b1,74b2 and 74c1,74c2. The flange halves 74b1,74b2 each define a thickness $T_3$ and the flange halves 74c1,74c2 each define a thickness $T_4$.

The thicknesses $T_3,T_4$ of the flanges are maximized and are greater than the respective wall thicknesses $T_1,T_2$ adjacent support web 74a, and taper as the distance from the support web 74a increases, until the thickness $T_3,T_4$ is equal the minimum thicknesses $T_1,T_2$ of walls 72a,72b, respectively. For added strength, the maximum thickness $T_3$ of flange 74b is preferably greater than the maximum thickness $T_4$ for flange 74c to provide added strength to inner (payload carrying) wall 72a and to reduce weight/material for outer wall 72b. Each panel 70 thus defines at least two vertically-extending hollow cores 75 separated by a primary I-beam post-member 74.

In addition to the one or more primary I-beam post-member 74, each panel further defines first and second partial or half I-beam post-members 78a,78b that are preferably mirror-images of each other. More particularly, the first half I-beam post-member 78a comprises a web defined by the end wall 72c, and first and second half-flanges 78a1,78a2 that are connected to and project transversely from the end wall 72c. The half-flanges 78a1,78a2 have respective thicknesses $T_5,T_6$ that are maximized and greater than the respective wall thicknesses $T_1,T_2$ adjacent end wall 72c and that taper as the distance from end wall 72c increases until the thicknesses are equal to the minimum wall thickness $T_1,T_2$, respectively.

Similarly, the second half I-beam post-member 78b comprises a web defined by the end wall 72d, and first and second half-flanges 78b1,78b2 that are connected to and project transversely from the end wall 72d. The half-flanges 78b1,78b2 have respective thicknesses $T_7,T_8$ that are maximized and greater than the respective wall thicknesses $T_7,T_8$ adjacent end wall 72d and that taper as the distance from end wall 72d increases until the thickness are equal to the minimum wall thicknesses $T_1,T_2$, respectively.

Referring again to FIG. 5A, those of ordinary skill in the art will recognize that when the first and second vertical panels 70-1,70-2 are abutted, with the rib 72r seated in groove 72g and walls 72c,72d in contact or very closely adjacent, and when the weld grooves E1,E2 are filled with a welding bead, the first half I-beam post-member 78a of first panel 70-1 and second half I-beam post-member 78b of second panel 70-2 together define a full secondary I-beam post-member 174 that has a structure that is at least substantially identical to the one or more primary I-beam post-members 74. As such, a sidewall 40a,40b defined from a plurality of interconnected panels 70 will comprise at least one primary I-beam post-member 74 defined as part of each panel 70, and another secondary I-beam post-member 174 defined at the interface of each pair of abutted panels 70. Also, when the multiple vertical panels 70 are interconnected to define a sidewall 40a,40b, the I-beam post-members 74,174 are all vertically oriented and parallel to each other and extend fully between the bottom rails 50a,50b and the respective top rails 60a,60b.

It is important to note that the integral I-beam post-members 74 (and 174) are not simply defined by perpendicular wall sections of uniform thickness. Instead, the post-members 74 include a web 74a, and the flanges 74b,74c are thicker adjacent the web 74a for strength and taper outwardly away from the web 74a into the minimum wall thicknesses $T_1,T_2$ for reduced weight. As such, the hollow cores 75 are not rectangular in profile but, instead, have eight or more sides owing to presence of the various tapered flange portions.

The walls 40*a*,40*b* are identically constructed, with the wall 40*a* being a mirror image of the wall 40*b* described herein. Those of ordinary skill in the art will recognize that a wall 40*b* constructed in accordance with the present development as shown in FIG. 5A includes smooth inner and outer faces 42*b*,44*b* which are highly desirable for payload dumping and fuel efficiency, respectively. Also, the hollow cores 75 of each vertical panel 70 insulate a payload such as hot asphalt. Furthermore, dent, dings and tears (and repairs of same) made to the inner face 42*b* by the payload or loading/unloading equipment do not affect the smooth appearance of the outer face 44*b* which enhances appearance and resale value. As noted above, because of the vertical orientation of the panels 70, any water or sand or the like that enters the vertical hollow cores 75 will fall by gravity into the first channel 52 of bottom rail 50*a*,50*b* owing to the stand-off projections 53*a*,53*b* as indicated by arrow D1 (FIG. 4B) where the sand or water or other flowable material can then flow out of the bottom rail 50*a*,50*b* at the rear of the trailer or at other openings defined in the channel 52. For added strength, the panels 70 of the sidewall 40*b* (including the I-beam post-members 74,174) are all vertically oriented and extend fully between the bottom and top rails 50*b*,60*b*, with lower edge 41 of each panel 70 of the wall 40*b* captured by the bottom rail 50*b* and the opposite, upper edge 43 of each panel 70 captured by the top rail 60*b*. In this manner, the horizontal bottom and top rails 50*b*,60*b* that extend the entire length SL of the sidewall 40*b* tie the multiple vertically extending panels 70 of the wall 40*b* together for high strength. With brief reference to FIGS. 2 and 3, the strength of the sidewall 40*b* is also enhanced by the fact that the vertical sidewall panels 70 define a height SH (FIG. 3) that is much less than the sidewall length SL (FIG. 2). The relative short vertical height SH of the panels 70 as compared to the long sidewall length SL, in combination with the fact that the vertical panels 70 are welded together and tied together by the bottom and top rails 50*b*,60*b* as noted above, greatly increases the strength of the sidewall 40*b* and minimizes or completely eliminates outward bowing of the sidewall 40*b* when a load is contained in the cargo-retaining space S. As noted, the walls 40*a* has the same structure as the wall 40*b*, but is arranged in a mirror-image fashion. With the described structure, the sidewalls 40*a*,40*b* are much stronger than walls constructed using lengthwise-extending extruded panels, and no center-pipe (as described above in relation to the prior art) is required to extend between and tie together the top rails 60*a*,60*b* to prevent outward bowing of the sidewalls 40*a*,40*b*, i.e., the left and right top rails 60*a*,60*b* are connected only adjacent the front and rear walls F,R, without a center-pipe brace spanning the open top of the cargo-retaining space S.

Referring again to FIG. 3, trailer floor 20 is preferably constructed from a plurality of horizontal floor panels 70' abutted with each other and fixedly secured together by welding, adhesive, and/or other suitable means. The panels are arranged perpendicular to the left and right bottom rails 50*a*,50*b* and extend horizontally between the rails 50*a*,50*b* for at least substantially the full length of the bottom rails 50*a*,50*b* to define the floor 20 of the cargo-retaining space S of the trailer body B. In particular, the floor 20 extends along and defines an axial length FL (FIG. 2) between the front and rear walls F,R, that is equal or substantially equal to the sidewall length SL.

FIG. 6 is a sectional view as taken along line 6—6 of FIG. 3 and shows a single floor panel 70' formed in accordance with the present development. The floor panel 70' is preferably defined as a monolithic member, most preferably as an extrusion of aluminum alloy, such as 6061-T6 aluminum alloy or another suitable aluminum alloy, having the profile shown in FIG. 6 and it is preferred that the panels 70' of floor be secured to adjacent floor panels 70' by welding as described below.

In the illustrated embodiment, each floor panel 70' has a profile that corresponds to the profile of the wall panels 70, but that is dimensioned differently. As such, like components of the panel 70' relative to the wall panel 70 of FIG. 5 are identified with like reference characters that include a primed (') suffix. Further explanation of these like features is not required here for those of ordinary skill in the art. In an alternative embodiment, the profiles of the wall panels 70 and floor panels 70' can differ in size and shape.

The inner (upper) and outer (lower) walls 72*a*',72*b*' preferably lie in respective horizontal planes and are arranged parallel to each other, and the first and second end walls 72*c*',72*d*' preferably lie in respective vertical planes and are arranged parallel to each other. As with the wall panels 70, the inner and outer walls 72*a*',72*b*' of the floor panels 70' can have the same minimum thickness but, because the inner wall 72*a*' is in contact with the bulk commodity cargo while the outer wall 72*b*' is not, it is preferred that the inner wall 72*a*' have a minimum thickness $T_1'$ that is greater than the minimum thickness $T_2'$ of outer wall 72*b*' to reduce weight and material cost while providing the required strength where needed.

It is important to note that a floor 20 constructed in accordance with the present development using a plurality of panels 70' defines smooth substantially planar inner (upper) and outer (lower) surfaces 22,24 (see FIGS. 3 and 6A) when the welding grooves E1',E2' are filled with a welding bead or an adhesive bead. This is highly desirable in that the smooth inner surface 22 facilitates payload dumping, while the smooth outer surface 24 reduces wind drag and does not allow for accumulation of asphalt paving material, ice/snow, corrosive ice/snow removal compounds, dirt, etc. Dents, dings and repairs of same made in the inner surface 22 do not show in the outer surface 24 which enhances appearance and resale value.

As with the wall panels 70, each floor panel 70' comprises at least one primary I-beam member 74' defined in its profile and further comprises first and second half I-beam members 78*a*',78*b*' that are preferably mirror-images of each other defined in its profile. Because the panel 70' is a floor panel instead of a wall panel, the I-beam member 74' is referred to as a primary I-beam cross-member (instead of a primary I-beam post-member) and the first and second half I-beam members 78*a*',78*b*' are referred to as half I-beam cross-members (instead of first and second half I-beam post-members). As shown in FIG. 6A, those of ordinary skill in the art will recognize that when the first and second panels 70-1',70-2' are abutted, with the rib 72*r*' seated in groove 72*g*' and walls 72*c*',72*d*' in contact or very closely adjacent, and when the weld grooves E1',E2' are filled with a weld bead or adhesive, the first half I-beam cross-member 78*a*' of first panel 70-1' and second half I-beam cross-member 78*b*' of second panel 70-2' cooperate to define a full secondary I-beam cross-member 174' having a structure that is at least substantially identical to the one or more primary I-beam cross-members 74'. The presence of the I-beam cross-members 74',174' ensures that the floor 20 has the required strength to support a payload without requiring any additional underlying support beams.

A floor 20 defined from a plurality of interconnected panels 70' will comprise at least one primary I-beam cross-member 74' defined as part of each panel 70', and another secondary I-beam cross-member 174' defined at the interface of each pair of abutted panels 70'. Also, when the multiple panels 70 are interconnected to define the floor 20, the I-beam cross-members 74,174 are all horizontally extending and parallel to each other and extend fully between the bottom rails 50a,50b. Preferably, the web 74a' of the I-beam cross-member 74' lies in a vertical plane and is parallel to the first and second end wall 72c',72d'. For added strength, the webs 74a' are vertically oriented within each panel 70' and are parallel to the vertical end walls 72c',72d' of each panel 70'. A floor 20 constructed in accordance with the present development includes smooth inner and outer faces 22,24 which are highly desirable for payload dumping and fuel efficiency, respectively. Also, the hollow cores 75' of each horizontal panel 70' insulate a payload such as hot asphalt. The transverse orientation of the panels 70', extending horizontally between the bottom rails 50a,50b instead of parallel to the rails 50a,50b, ensures that any water or sand or the like that enters the hollow cores 75' will flow laterally outward into the channels 54 of the rails 50a,50b as indicated by arrow D2 (FIGS. 4B,4C,4D) where the sand or water or other flowable material can then flow out of the bottom rail 50a,50b at the rear of the trailer or at other openings defined in the channel 54. For added strength, the panels 70' of the floor 20 (including the I-beam cross-members 74',174') are all transversely oriented and extend fully between the bottom rails 50a,50b with the opposite left and right edges 20a,20b of the floor 20 captured by the channels 54 of the bottom rails 50a,50b. In this manner, the horizontal bottom rails 50a,50b that extend the entire length FL of the floor 20 tie the multiple transverse panels 70' of the floor 20 together for high strength. With brief reference to FIGS. 2 and 3, the strength of the floor 20 is enhanced by the fact that the transverse floor panels 70' define a width FW (FIG. 3) that is much less than the floor length FL (FIG. 2). The relative short transverse width FW of the floor panels 70' as compared to the long floor length FL, in combination with the fact that the floor panels 70 are welded together and tied together by the bottom rails 50a, 50b as noted above, greatly increases the strength of the floor 20.

FIG. 7 illustrates an alternative floor panel 270' that is identical to the panel 70' except as otherwise shown and/or described. As such, like components of the panel 270' relative to the panel 70' are identified with like reference characters that are two-hundred greater than those used in FIGS. 6 and 6A. The floor panel 270' can be used in place or all or some of the floor panels 70' used to define the floor 20, for example where a higher-strength floor or high-strength floor section is required. The panel 270' comprises in its extrusion profile at least two integral I-beam cross-members 274' instead of a single I-beam cross-member. As such, at least three hollow regions 275' are defined, but each has a width 270w that is smaller than a corresponding width of the hollow regions 75' of floor panel 70' which increases the strength of the panel 270' relative to the panel 70'. In particular, the inner and outer walls 272a',272b' have shorter unsupported spans as compared to the walls 72a',72b' of panel 70' for added strength.

To construct a trailer body B, it is preferred that the walls 40a,40b and floor 20 be fully constructed by welding or otherwise securing the panels 70,70' to each other. Thereafter, the bottom rails 50a,50b and top rails 60a,60b are connected respectively thereto as described above to define the trailer body B. The wheels W and other components of the trailer T are then connected to the trailer body B to define the overall trailer.

The trailer body B can be used as a dump body that is carried on a powered straight truck chassis having its own wheel/axle assemblies without departing from the overall scope and intent of the present development.

The development has been described with reference to preferred embodiments. The following claims are not limited to the preferred embodiments and are intended to be construed literally and/or according to the doctrine or equivalents to encompass modifications and alterations to the fullest possible extent.

The invention claimed is:

1. A trailer body comprising;
    left and right bottom rails extending parallel to each other and parallel to a longitudinal axis, said left and right bottom rails each comprising a first channel that opens upwardly and a second channel that opens laterally;
    left and right top rails extending parallel to each other and parallel to said longitudinal axis, said left and right top rails spaced vertically above said left and right bottom rails, respectively;
    a horizontal floor extending between said left and right bottom rails, said floor comprising a plurality of one-piece extruded floor panels that are each abutted with at least one adjacent floor panel and that each extend horizontally between the left and right bottom rails transversely relative to said longitudinal axis, wherein said floor comprises a left lateral edge that is seated in said second channel of said left bottom rail and comprises a right lateral edge that is seated in said second channel of said right bottom rail;
    a left vertical sidewall located between said left bottom rail and said left top rail, said left vertical sidewall comprising a plurality of one-piece extruded wall panels that are each abutted with at least one adjacent wall panel of said left sidewall and that each extend vertically between said left bottom rail and said left top rail, wherein said left sidewall is seated in said first channel of said left bottom rail;
    a right vertical sidewall located between said right bottom rail and said right top rail, said right sidewall comprising a plurality of said one-piece extruded wall panels that are each abutted with at least one adjacent wall panel of said right sidewall and that each extend vertically between said right bottom rail and said right top rail, wherein said right sidewall is seated in said first channel of said right bottom rail;
    wherein said extruded floor panels and said extruded wall panels each comprise inner and outer faces interconnected by first and second spaced-apart end walls and at least one web that spans an interior space between said inner and outer faces, wherein said at least one web defines said interior space to have at least two separate hollow cores;
    wherein said first and second end walls and said at least one web of said extruded floor panels extend horizontally between said left and right bottom rails;
    wherein said first and second end walls and said at least one web of said wall panels of said left sidewall extend vertically between said left bottom rail and said left top rail; and,
    wherein said first and second end walls and said at least one web of said wall panels of said right sidewall extend vertically between said right bottom rail and said right top rail.

2. The trailer body as set forth in claim 1, wherein said first and second end walls and said at least one web of said extruded floor panels lie in respective vertical planes and are parallel to each other, and wherein said inner and outer faces of said extruded floor panels lie in respective horizontal planes and are parallel to each other.

3. The trailer body as set forth in claim 1, wherein said first and second end walls and said at least one web of said extruded wall panels lie in respective vertical planes and are parallel to each other, and wherein said inner and outer faces of said extruded wall panels lie in respective vertical planes and are parallel to each other.

4. The trailer body as set forth in claim 1, wherein said first and second end walls of said extruded wall panels define respective first and second mating structures, and wherein said first and second mating structures of adjacent abutted extruded wall panels are inter-fitted with each other.

5. The trailer body as set forth in claim 1, wherein said first and second end walls of said extruded floor panels define respective first and second mating structures, and wherein said first and second mating structures of adjacent abutted extruded floor panels are interfitted with each other.

6. The trailer body as set forth in claim 1, wherein said at least one web and said inner and outer faces of each extruded floor panel define a primary I-beam cross-member in a profile of said extruded floor panel, said primary I-beam cross-member comprising first and second flanges defined by portions of said inner and outer faces that are thicker adjacent said at least one web and that taper in thickness as a distance from said at least one web increases.

7. The trailer body as set forth in claim 6, wherein:
said first end wall and said inner and outer faces of each extruded floor panel define a first half I-beam cross-member in said profile of said extruded floor panel, said first half I-beam cross-member comprising first and second flanges defined by portions of said inner and outer faces that are thicker adjacent said first end wall and that taper in thickness as a distance from said first end wall increases;
said second end wall and said inner and outer faces of each extruded floor panel define a second half I-beam cross-member in said profile of said extruded floor panel, said second half I-beam cross-member comprising first and second flanges defined by portions of said inner and outer faces that are thicker adjacent said second end wall and that taper in thickness as a distance from said second end wall increases;
and wherein said first and second half I-beam cross-members of adjacent abutted extruded floor panels of said floor together define respective secondary I-beam cross-members.

8. The trailer body as set forth in claim 1, wherein said at least one web and said inner and outer faces of each extruded wall panel define a primary I-beam post-member in a profile of said extruded wall panel, said primary I-beam post-member comprising first and second flanges defined by portions of said inner and outer faces that are thicker adjacent said at least one web and that taper in thickness as a distance from said at least one web increases.

9. The trailer body as set forth in claim 8, wherein:
said first end wall and said inner and outer faces of each extruded wall panel define a first half I-beam post-member in said profile of said extruded wall panel, said first half I-beam post-member comprising first and second flanges defined by portions of said inner and outer faces that are thicker adjacent said first end wall and that taper in thickness as a distance from said first end wall increases;
said second end wall and said inner and outer faces of each extruded wall panel define a second half I-beam post-member in said profile of said extruded wall panel, said second half I-beam post-member comprising first and second flanges defined by portions of said inner and outer faces that are thicker adjacent said second end wall and that taper in thickness as a distance from said second end wall increases;
and wherein said first and second half I-beam post-members of adjacent abutted extruded wall panels of said left and right sidewalls together define respective secondary I-beam post-members.

10. The trailer body as set forth in claim 7, wherein said at least one web and said inner and outer faces of each extruded wall panel define a primary I-beam post-member in a profile of said extruded wall panel, said primary I-beam post-member comprising first and second flanges defined by portions of said inner and outer faces that are thicker adjacent said at least one web and that taper in thickness as a distance from said at least one web increases.

11. The trailer body as set forth in claim 10, wherein:
said first end wall and said inner and outer faces of each extruded wall panel define a first half I-beam post-member in said profile of said extruded wall panel, said first half I-beam post-member comprising first and second flanges defined by portions of said inner and outer faces that are thicker adjacent said first end wall and that taper in thickness as a distance from said first end wall increases;
said second end wall and said inner and outer faces of each extruded wall panel define a second half I-beam post-member in said profile of said extruded wall panel, said second half I-beam post-member comprising first and second flanges defined by portions of said inner and outer faces that are thicker adjacent said second end wall and that taper in thickness as a distance from said second end wall increases;
and wherein said first and second half I-beam post-members of adjacent abutted extruded wall panels of said left and right sidewalls together define respective secondary I-beam post-members.

12. The trailer body as set forth in claim 1, further comprising:
spaced-apart front and rear walls arranged transverse to and extending between said left and right sidewalls, wherein said trailer body defines an open top and wherein said left and right top rails are interconnected only adjacent said front and rear walls.

13. The trailer body as set forth in claim 1, wherein said wall panel inner faces define respective minimum thicknesses that are greater than respective corresponding minimum thicknesses of said wall panel outer faces.

14. The trailer body as set forth in claim 1, wherein said floor panel inner faces define respective minimum thicknesses that are greater than respective corresponding minimum thicknesses of said floor panel outer faces.

15. The trailer body as set forth in claim 1, wherein adjacent abutted floor panels are welded together, adjacent abutted wall panels of said left sidewall are welded together, and adjacent abutted wall panels of said right sidewall are welded together.

* * * * *